April 12, 1960
A. C. KORTE
2,932,398
COMPACT FUEL FILTER
Filed March 4, 1957
2 Sheets-Sheet 1
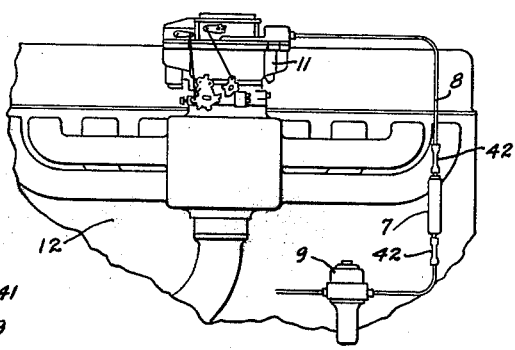
FIG. I.
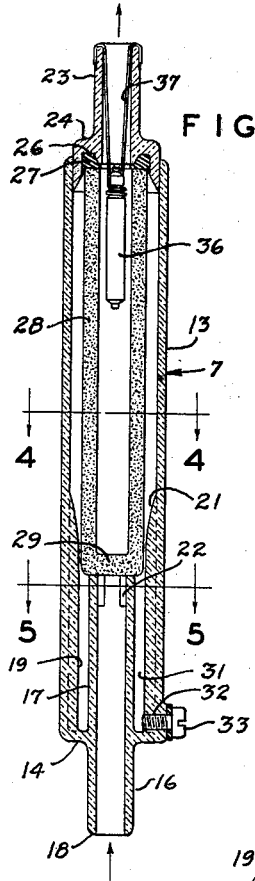
FIG. 2.
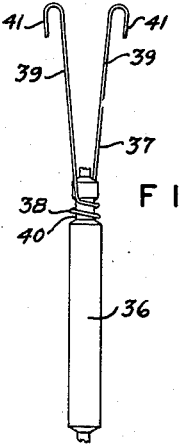
FIG. 6.
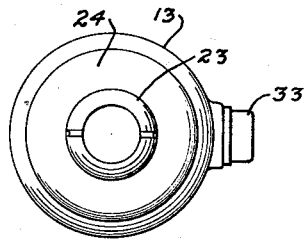
FIG. 3.
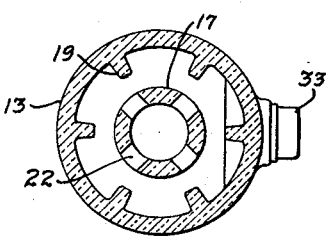
FIG. 5.
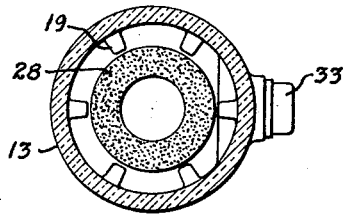
FIG. 4.
INVENTOR.
ALFRED C. KORTE
BY
Bertram H. Mann
ATTORNEY April 12, 1960

A. C. KORTE 2,932,398

COMPACT FUEL FILTER

Filed March 4, 1957

INVENTOR.
ALFRED C. KORTE

BY *Bertram N. Mann*

ATTORNEY

United States Patent Office 2,932,398
Patented Apr. 12, 1960

2,932,398

COMPACT FUEL FILTER

Alfred C. Korte, St. Louis, Mo., assignor to ACF Industries, Incorporated, New York, N.Y., a corporation of New Jersey Application March 4, 1957, Serial No. 643,583

6 Claims. (Cl. 210—223)

This invention relates to filters, and more particularly to filters adapted for use in removing solid foreign particles from liquid fuel passing through a fuel system to an internal combustion engine.

An object of the invention is to provide a fuel filter which is relatively simple and inexpensive to manufacture and efficient in operation.

Another object of the invention is to provide a fuel filter of elongated cylindrical shape substantially conforming to the contour of a fuel line to thereby occupy a minimum amount of space.

A further object of the invention resides in the provision of a fuel filter having inlet and outlet nozzles at opposite ends thereof to facilitate mounting of the filter in a fuel line by means of resilient synthetic rubber nipples.

Another object of the invention is to provide a filter having a sediment chamber defined by a standpipe within one end of a tubular housing which is preferably formed of transparent or translucent material to permit visual inspection of the contents of the sediment chamber.

Another object of the invention is to provide a filter having an elongated tubular fuel filtering element adapted to be resiliently mounted within a housing during assembly of the filter.

Another object of the invention is to provide a permanent magnet within the outlet end of a filter element to engage and remove any ferrous metal particles from the fuel passing therethrough, and also to provide a relatively simple, inexpensive mounting means for the magnet.

The invention embodies other novel features, details of construction and arrangement of parts which are hereinafter set forth in the specification and claims, and illustrated in the accompanying drawings, wherein:

Fig. 1 is a fragmentary side elevational view illustrating the manner in which the filter is incorporated in an engine fuel system to remove impurities from fuel flowing therethrough.

Fig. 2 is an enlarged longitudinal sectional view illustrating the filter.

Fig. 3 is a top plan view of same, with parts removed.

Figs. 4 and 5 are transverse sectional views taken along the lines 4—4 and 5—5, respectively, of Fig. 2.

Fig. 6 is an enlarged detail side elevational view illustrating the permanent magnet and the means for mounting same in the filter.

Figure 7:
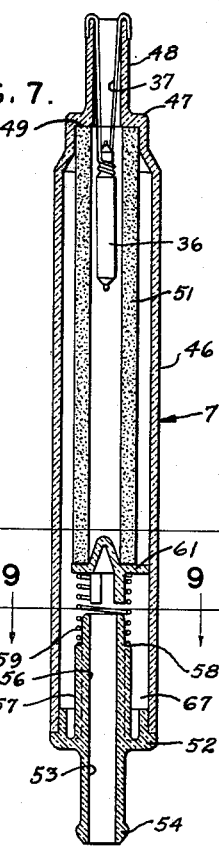

Fig. 7 is a longitudinal sectional view illustrating a modified form of the invention.

Figure 9:
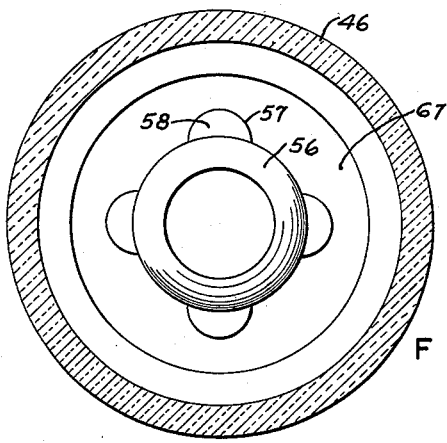
Figure 8:
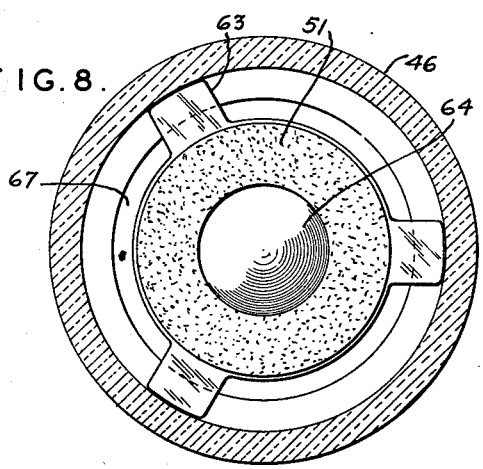

Figs. 8 and 9 are enlarged transverse sectional views taken along the lines 8—8 and 9—9, respectively.

Figure 10:
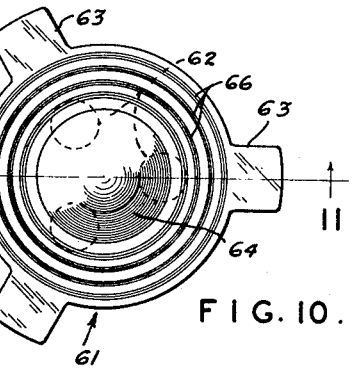

Fig. 10 is an enlarged detail plan view illustrating a combined plug and guide member for the filter element.

Figure 11:
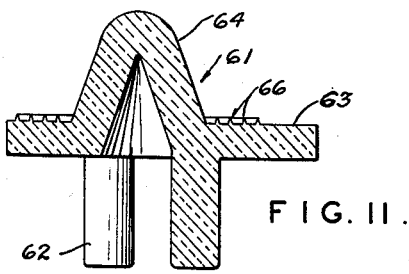

Fig. 11 is a sectional view taken along the line 11—11 of Fig. 10.

Referring now to the drawing for a better understanding of the invention, the filter 7 is shown in Fig. 1 as forming part of a fuel line 8 leading from a pump 9 to the fuel bowl of a carburetor 11 of an internal combustion engine 12.

The filter is shown as comprising an elongated cylindrical housing 13 having a length substantially greater than its diameter to conform generally to the shape of the fuel line and, therefore, occupy a minimum amount of space. The housing is provided with an end wall 14 supporting a tubular section 16 intermediate its ends to provide a combined standpipe 17 and a fuel inlet nozzle 18. The lower end of the housing is also formed with internal circumferentially spaced, longitudinally extending ribs 19 having arcuate surfaces 21 terminating above the upper end of the standpipe 17. Recesses or apertures 22 are formed in the upper end of the standpipe 17 for the passage of fuel therethrough.

A fuel outlet nozzle 23 is formed with a body portion 24 telescopically engaged within and cemented to the open upper end of the housing 13. The body portion 24 is formed with an annular recess 26 to snugly receive a resilient ring gasket 27 for sealing engagement with the rim of a tubular filter element 28 formed of conventional porous ceramic filter material. The lower end of the filter element is closed by an end wall 29 and seated against the upper end of the standpipe 17 between the ribs 19.

As illustrated in Fig. 2, the space surrounding the standpipe 17 below the recesses 22 provides an annular sediment chamber 31 to receive solid particles filtered from the fuel, such particles being discharged from the chamber through a threaded drain opening 32 which is normally closed by a removable screw 33. To visually indicate the quantity of foreign material in the sediment chamber 31, the housing 13 is preferably formed of transparent or translucent material, such as glass, nylon, or other suitable transparent or translucent plastic, resistant to gasoline or other liquid fuels. It is contemplated that the fuel outlet nozzle 23 and housing 13 may be inexpensively formed from the same type of material.

It will be noted that the filter thus shown and described comprises a minimum number of inexpensive parts which are readily assembled by merely inserting the filter element 28 and outlet nozzle 23 into the housing 13 and then securing the nozzle to the housing by means of a suitable cement to provide a leakproof joint therebetween. During assembly, it will be noted that the arcuate surfaces 21 on the ribs 19 serve to guide the lower closed end of the filter element 28 into axial alignment with and abutting engagement against the standpipe 17, and that the resilient gasket 27 and ribs 19 serve to engage the filter element against movement relative to the housing 13.

To remove any small ferrous metal particles from fuel passing through the filter element into the outlet nozzle 23, a permanent magnet 36 is suspended within the open end of the filter element by a support 37 comprising a piece of wire bent intermediate its ends to form helical loops 38, engaged in an annular recess 40 in the magnet, and diverging arms 39—39 formed with hook portions 41 at their ends to receive the rim of the output nozzle. It will be understood that the larger metal particles, and other foreign material, will not pass through the filter element and will be collected in the sediment chamber 31. As is clearly shown in the drawings, the magnet 36 is smaller than the outlet 23, and may be easily removed and inserted through the outlet.

The filter 7 is adapted to be quickly mounted in an upright position, horizontal position, or other position, in a fuel line by means of resilient synthetic rubber nipples 42 sleeved over the inlet and outlet nozzles 18 and 23 and the ends of the fuel line conduits adjacent thereto. To occupy a minimum amount of space, the filter housing may have, for example, a diameter of ⅞ inch and a length of 5 inches and, thus, substantially conforms to the contour of the fuel line.

In operation, liquid fuel passes from the pump through the inlet nozzle 18, standpipe 17, and recesses 22 into the housing 13, and thence through the ceramic filter element 28 and outlet nozzle 23 to the carburetor. While the fuel system is in operation, the larger solid particles of foreign material settle downwardly into the sediment chamber 31, and any relative small ferrous metal particles which may pass through the filter element 28 are removed from the fuel by the magnet 36.

Figs. 7 to 11 illustrate a modified form of the invention in which the filter is shown as comprising an elongated tubular housing 46 formed with an end wall 47 and an outlet nozzle 48. An annular socket or seat 49 is formed on the end wall 47 to receive one end of a ceramic filter element 51.

A plug 52 is telescopically engaged within and cemented to the housing 46 and formed with a tubular section 53 to provide an inlet nozzle 54 and a standpipe 56. A plurality of circumferentially spaced ribs 57 are formed on the outer side of the standpipe to provide a spring seat 58 to engage one end of a compression spring 59. The other end of the spring 59 is seated against seat member 61 providing an end wall for the filter element 51 and closing the end of the filter element adjacent the inlet nozzle 54.

A plurality of fingers 62 are formed on the member 61 to internally engage the adjacent convolution of the spring. Radial lugs 63 are formed on the member 61 to engage the inner surface of the housing. The seat member 61 is also formed with a centrally disposed conical boss 64 for insertion into the end of the ceramic filter element. To provide a fluid-tight seal, the seat member 61 is preferably formed of relatively soft, resilient material, such as nylon or synthetic rubber, provided with concentric, circular ribs 66 for engagement against the end of the filter element. Obviously, the permanent magnet 36 may be suspended within the outlet end 48 of the filter by the support 37, as previously described.

In this form of the invention, the housing 46 is preferably formed of transparent or translucent material, such as glass or nylon, to permit visual inspection of the material within the sediment chamber 67 surrounding the standpipe 56. The plug 52 is also preferably formed of plastic material, such as nylon or glass. If necessary, a suitable gasket may be provided in the socket 49 for engagement by the filter element 51 to form a leakproof joint therebetween.

Due to the inexpensive construction, it is economically feasible to discard the filter 7 after a predetermined period of service and replace same by a new filter to insure efficient filtering operation. However, the magnetic filter 36 and its support 37 may be removed from the old filter, cleaned, and inserted into the new filter.

While the filter is preferably disposed in an upright vertical position in the fuel line, for optimum effectiveness of the sediment chamber, it will be apparent that the filter may be arranged in an angular or horizontal position and function to remove foreign material from fuel flowing therethrough. In the claims, the term "cup-shaped filter element" is merely used to define a tubular filter element closed at one end thereof.

Certain structures have been described herein which will fulfill all the objects of the present invention, but it is contemplated that other modifications will be obvious to those skilled in the art which come within the scope of the invention as defined by the appended claims.

I claim:

1. A liquid filter for separating foreign matter from liquid fuel passing through a fuel conduit to an internal combustion engine, comprising a filter body, said body including a tubular housing and axially extending tubular inlet and outlet nozzles secured to opposite ends of said tubular housing for forming with said tubular housing a continuous part of the fuel conduit, a standpipe in said body leading from said inlet nozzle and directed toward said tubular housing and spaced from the inner wall of said filter body at one end thereof to define a sediment trap between the outer wall of said standpipe and the inner wall of said filter body, and a tubular filter element in said body, said filter element being arranged in a concentric manner within said tubular housing spaced from the inner wall of said tubular housing, a closed end wall for said tubular filter element supported in said filter body adjacent the inner end of said standpipe to form a fuel passage between said closed end of said tubular filter element and the adjacent end of said standpipe to permit passage of fuel directly from said inlet nozzle to said sediment trap and from said sediment trap around the outside of said tubular filter, a rim portion at the opposite open end of said tubular filter element seated in said filter body adjacent the end of said tubular housing opposite said standpipe and a seal between said rim portion and said filter element, the open end of said tubular filter element and said outlet nozzle being arranged to form a continuous passage from the inside of said tubular filter element for discharging fuel passing through said filter element from the outside into said passage.

2. A liquid filter for separating foreign matter from liquid fuel passing through a fuel conduit to an internal combustion engine, comprising a filter body, said body including a tubular housing and axially extending tubular inlet and outlet nozzles secured to opposite ends of said tubular housing for forming with said tubular housing a continuous part of the fuel conduit, a standpipe in said body leading from said inlet nozzle and directed upwardly toward said tubular housing and spaced from the inner wall of said body at one end thereof to define a sediment trap between the outer wall of said standpipe and the inner wall of said filter body, and a tubular filter element in said body, internal longitudinally extending ribs in said filter body for supporting said filter element in a concentric manner within said tubular housing and spaced from the inner wall of said tubular housing, a closed end wall for said tubular filter element supported in said filter body adjacent the inner end of said standpipe to form a fuel passage between said closed end of said hollow tubular filter and the adjacent open end of said standpipe to permit passage of fuel directly from said inlet nozzle to said sediment trap and from said sediment trap around the outside of said tubular filter element, a rim portion at the opposite end of said tubular filter element seated in said filter body adjacent the end of said tubular housing opposite said standpipe, and a seal between said rim portion and said filter body, the open end of said tubular filter and said outlet nozzle being arranged to form a continuous passage from the inside of said tubular filter for discharging fuel passing through said filter element from the outside thereof into said passage.

3. A liquid filter for separating foreign matter from liquid fuel passing through a fuel conduit to an internal combustion engine, comprising a filter body, said body including a tubular housing and axially extending tubular inlet and outlet nozzles secured to opposite ends of said tubular housing for forming with said tubular housing a continuous part of the fuel conduit, a standpipe in said body leading from said inlet nozzle and directed upwardly toward said tubular housing and spaced from the inner wall of said body at one end thereof to define a sediment trap between the outer wall of said standpipe and the inner wall of said filter body, and a tubular filter element in said body, said filter element being arranged in a concentric manner within said tubular housing and spaced from the inner wall of said tubular housing, a closed end wall for said tubular filter element adjacent the inner end of said standpipe, a spring surrounding said standpipe and engaging said closed end wall of said tubular filter element for supporting said filter element with its closed end adjacent the inner end of said standpipe to form a fuel passage between said closed end of said tubular filter element and the adjacent end of said standpipe to permit the passage of fuel directly from said inlet nozzle to said sediment trap and from said sediment trap around the outside of said tubular filter element, resilient ribs on said closed end wall for centering said filter element in said filter body, a rim portion at the opposite open end of said tubular filter element seated in said filter body by the pressure of said spring acting on the end of said tubular housing adjacent said standpipe, and a seal between said rim portion and said filter element, the open end of said tubular filter and said outlet nozzle being arranged to form a continuous passage from the inside of said tubular filter element for discharging fuel passing through said filter element from the outside into said passage.

4. A liquid filter for separating foreign matter from liquid fuel passing through a fuel conduit to an internal combustion engine, comprising a filter body, said body including a tubular housing and axially extending tubular inlet and outlet nozzles secured to opposite ends of said tubular housing for forming with said tubular housing a continuous part of the fuel conduit, a standpipe in said body leading from said inlet nozzle and directed toward said tubular housing and spaced from the inner wall of said filter body at one end thereof to define a sediment trap between the outer wall of said standpipe and the inner wall of said filter body, and a tubular filter element in said body, said filter element being arranged in a concentric manner within said tubular housing spaced from the inner wall of said tubular housing, an end wall for closing the end of said tubular filter element adjacent the inner end of said standpipe, said end wall including a projection extending into the tubular filter element for centering said filter element with respect to said end wall and radially extending lugs on said end wall for centering said tubular filter element with respect to said filter body, resilient elements on said end wall forming a seal between said end wall and one end of said tubular filter element, said end wall being arranged in said filter body to form a fuel passage between said end wall and the adjacent end of said standpipe to permit passage of fuel directly from said inlet nozzle to said sediment trap, and from said sediment trap around the outside of said tubular filter element, a rim portion at the opposite end of said tubular filter element seated in said filter body adjacent the end of said tubular housing opposite said standpipe and a seal between said rim portion and said filter element, the open end of said tubular filter and said outlet nozzle being arranged to form a continuous passage from the inside of said tubular filter element for discharging fuel passing through said filter element from the outside.

5. A liquid filter for separating foreign matter from liquid fuel passing through a fuel conduit to an internal combustion engine, comprising a filter body, said body including a tubular housing and axially extending tubular inlet and outlet nozzles secured to opposite ends of said tubular housing for forming with said tubular housing a continuous part of the fuel conduit, a standpipe in said body leading from said inlet nozzle and directed toward said tubular housing and spaced from the inner wall of said filter body at one end thereof to define a sediment trip between the outer wall of said standpipe and the inner wall of said filter body, a tubular filter element in said body, said filter element being arranged in a concentric manner within said tubular housing spaced from the inner wall of said tubular housing, a closed end wall for said tubular filter element, an extension on said closed end wall projecting within said tubular filter element to act as a locating means for said tubular filter element in said tubular housing, said end wall being located axially of said tubular housing and supported in said tubular housing to resiliently urge said filter element in a direction away from the inner end of said standpipe to form a fuel passage between the closed end of said tubular filter element and the adjacent end of said standpipe to permit passage of fuel directly from said inlet nozzle to said sediment trap, and from said sediment trap around the outside of said tubular filter element, a rim portion on the opposite end of said tubular filter element seated in said filter body adjacent the end of said tubular housing opposite said standpipe, and a resilient sealing ring between said rim portion and said filter element compressed by the resilient force acting on said closed end wall, the open end of said tubular filter element and said outlet nozzle being arranged to form a continuous passage from the inside of said tubular filter element for discharging fuel passing through said filter element from the outside to the inside thereof.

6. A liquid filter for separating foreign matter from liquid fuel passing through a fuel conduit to an internal combustion engine, comprising a filter body, said body including a tubular housing and axially extending tubular inlet and outlet nozzles secured to opposite ends of said tubular housing, said inlet and outlet nozzles being adapted to receive rubber coupling sleeves for connection with said conduit so that said filter body forms a continuous part of the fuel conduit, a standpipe in said body leading from said inlet nozzle and directed toward said tubular housing and spaced from the inner wall of said tubular body at one end thereof to define a sediment trap between the outer wall of said standpipe and the inner wall of said filter body, and a tubular filter element in said body, said filter body being arranged in a concentric manner within said tubular housing spaced from the inner wall of said tubular housing, a closed end wall for said tubular filter element supporting said filter body with its closed end adjacent the inner end of said standpipe to form a fuel passage between said closed end of said tubular filter and the adjacent end of said standpipe to permit passage of fuel directly from said inlet nozzle to said sediment trap and from said sediment trap around the outside of said tubular filter element, a rim portion at the opposite open end of said tubular filter element seated in said filter body adjacent the end of said tubular housing opposite said standpipe, a seal between said rim portion and said filter element, the open end of said tubular filter element and said outlet nozzle being arranged to form a continuous passage from the inside of said tubular filter element for discharging fuel passing through said filter element from the outside of said filter element to said passage and out of said nozzle, and a magnet smaller than said passage suspended therein, said suspension means having hooked-shaped ends engaging around the open end of said outlet nozzle and adapted to be secured against removal by a rubber coupling sleeve.

References Cited in the file of this patent

UNITED STATES PATENTS

| | | |
|---|---|---|
| 780,069 | Shelden | Jan. 17, 1905 |
| 2,104,519 | Hurn | Jan. 4, 1938 |
| 2,222,123 | Schwab | Nov. 19, 1940 |
| 2,548,965 | Gaugler | Apr. 17, 1951 |
| 2,557,557 | Newcum | June 19, 1951 |
| 2,587,903 | Rood | Mar. 4, 1952 |
| 2,760,637 | Franch | Aug. 28, 1956 |
| 2,795,333 | Kennedy | June 11, 1957 |
| 2,798,613 | Tinker | July 9, 1957 |

FOREIGN PATENTS

| | | |
|---|---|---|
| 378,455 | Italy | Feb. 10, 1940 |
| 50,236 | Norway | Feb. 22, 1932 |